United States Patent [19]
Fujimoto et al.

[11] Patent Number: 5,888,037
[45] Date of Patent: Mar. 30, 1999

[54] METHOD OF AND APPARATUS FOR MOVING FEED SHAFTS OF NUMERICAL CONTROLLED MACHINE TOOL

[75] Inventors: Akihiko Fujimoto; Takashi Nagatomi, both of Oshino-mura, Japan

[73] Assignee: Fanuc, Ltd., Minamitsuru, Japan

[21] Appl. No.: 860,323

[22] PCT Filed: Oct. 24, 1996

[86] PCT No.: PCT/JP96/03111

§ 371 Date: Jun. 23, 1997

§ 102(e) Date: Jun. 23, 1997

[87] PCT Pub. No.: WO97/15874

PCT Pub. Date: May 1, 1997

[30] Foreign Application Priority Data

Oct. 24, 1995 [JP] Japan ................................ 7-275976

[51] Int. Cl.$^6$ .................................................. B23C 1/16
[52] U.S. Cl. ..................... 409/79; 364/474.3; 408/1 R; 409/132; 409/183
[58] Field of Search ................... 408/1 R, 3, 17; 409/79, 80, 84, 132, 183; 364/474.3, 474.31, 474.29

[56] References Cited

FOREIGN PATENT DOCUMENTS

| 62-22107 | 1/1987 | Japan . |
|---|---|---|
| 63-180108 | 7/1988 | Japan . |
| 4-347705 | 12/1992 | Japan . |
| 6-180605 | 6/1994 | Japan . |

*Primary Examiner*—Andrea L. Pitts
*Assistant Examiner*—Adesh Bhargava
*Attorney, Agent, or Firm*—Staas & Halsey

[57] ABSTRACT

A feed-shaft moving method and an apparatus capable of reducing non-cutting motion time. In a first section and a second section, an immediately preceding path is connected with a rapid traverse by a rapid traverse motion path having a curve continuous with the immediately preceding path. The movement is accelerated up to a rapid traverse speed while passing the curve. In the first section, the path is connected with the next path by a rapid traverse path having a curve continuous with the next movement. The movement is decelerated to the next moving speed while passing the curve. The rapid traverse motion of the feed shaft can be completed in less time, with unnecessary interruption and with no impact on the machine.

34 Claims, 16 Drawing Sheets

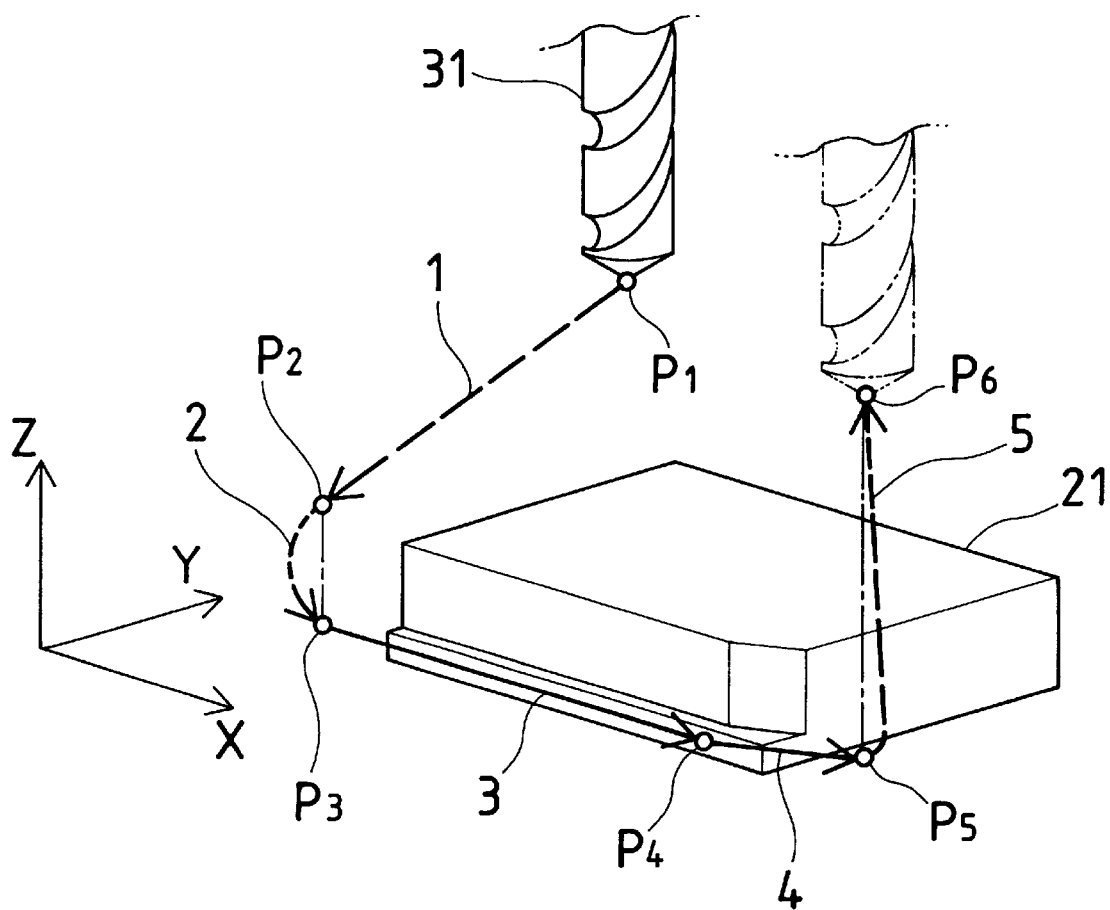

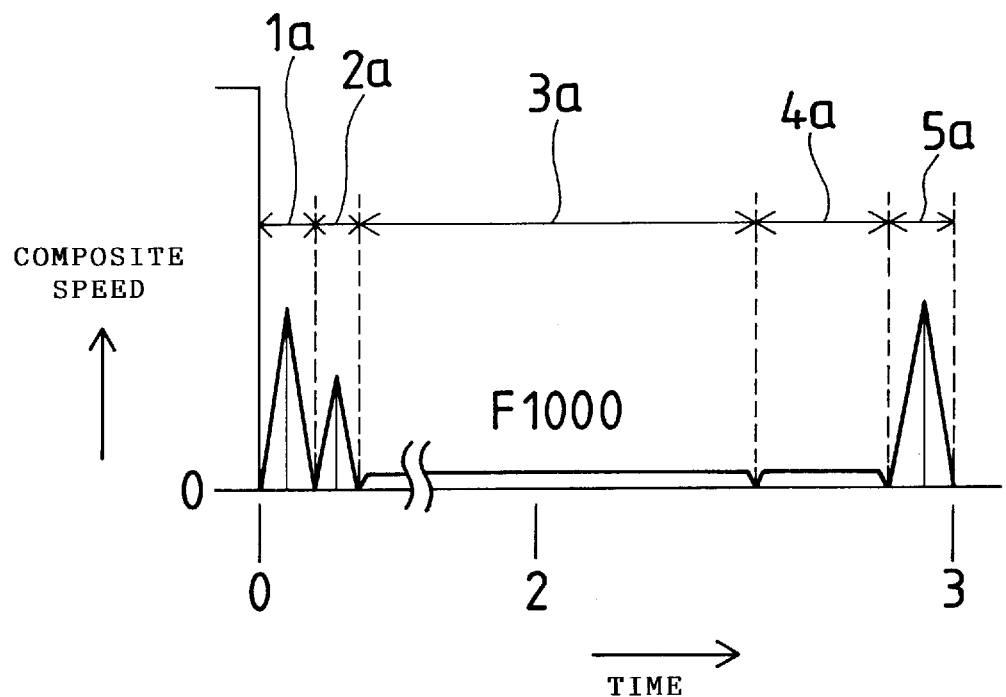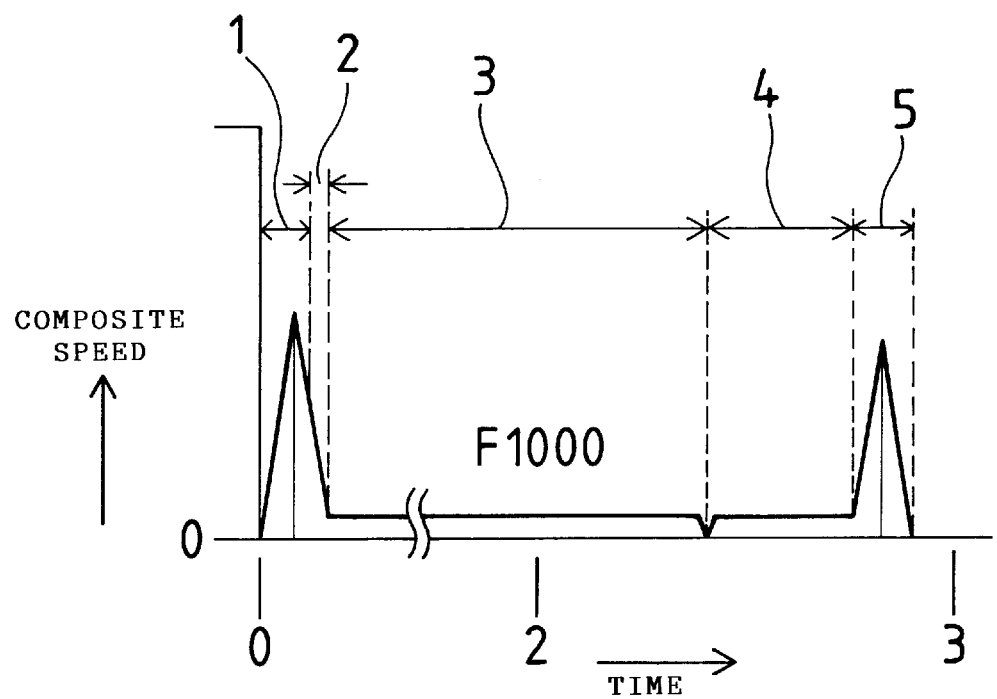

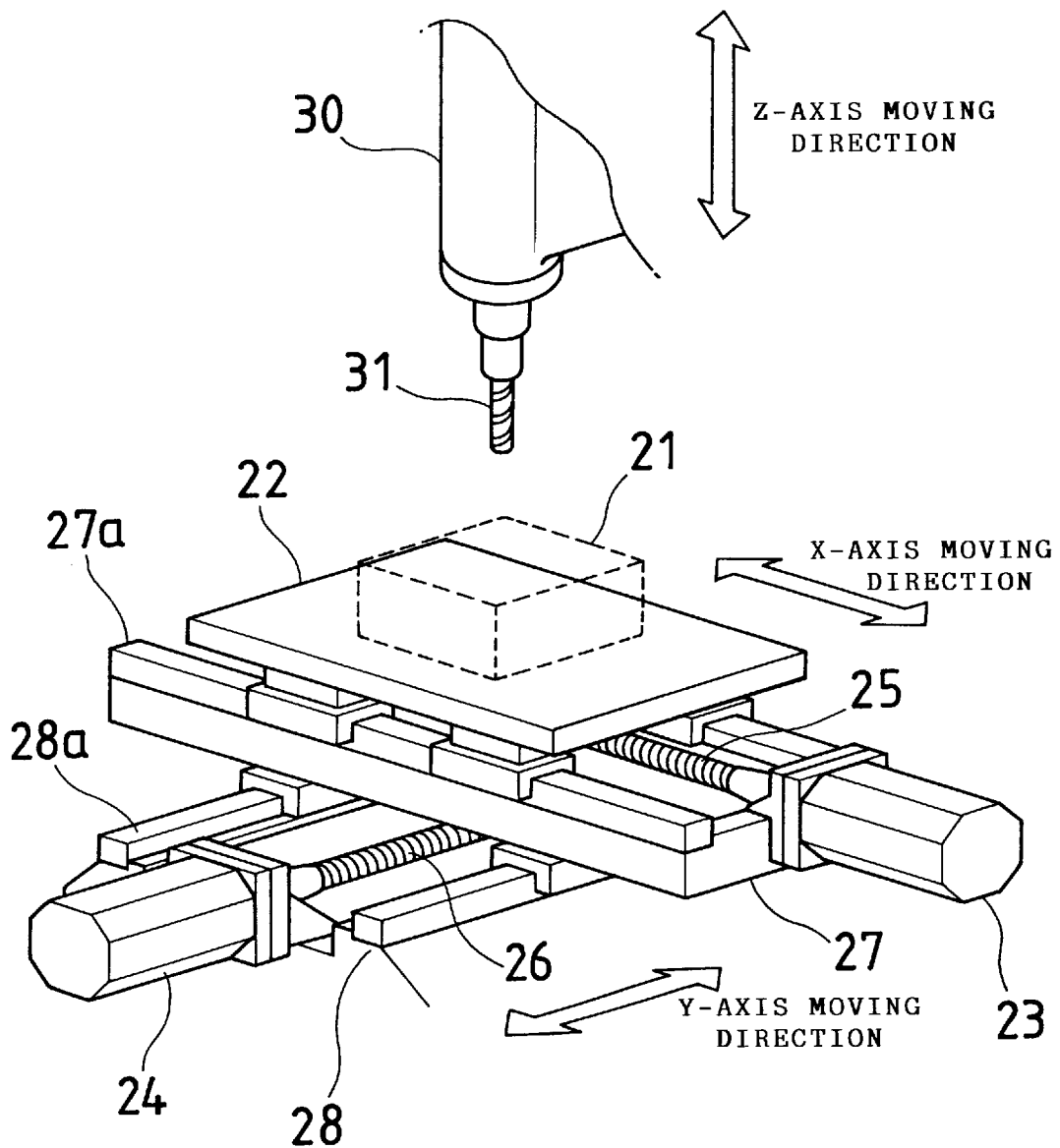

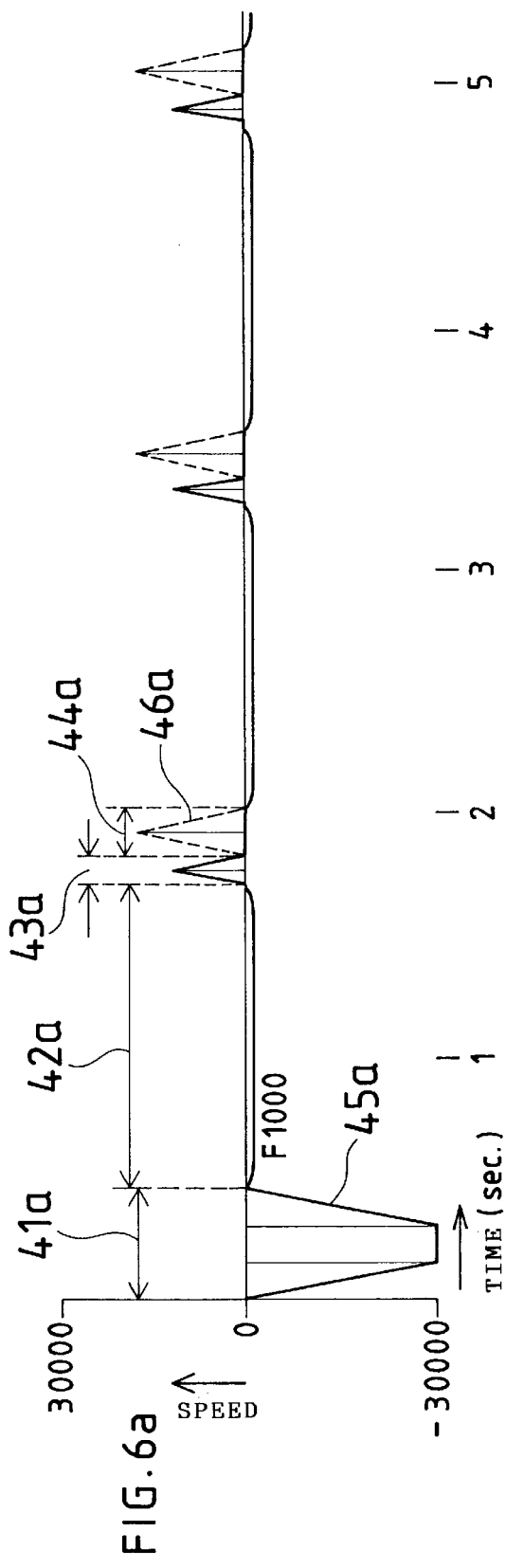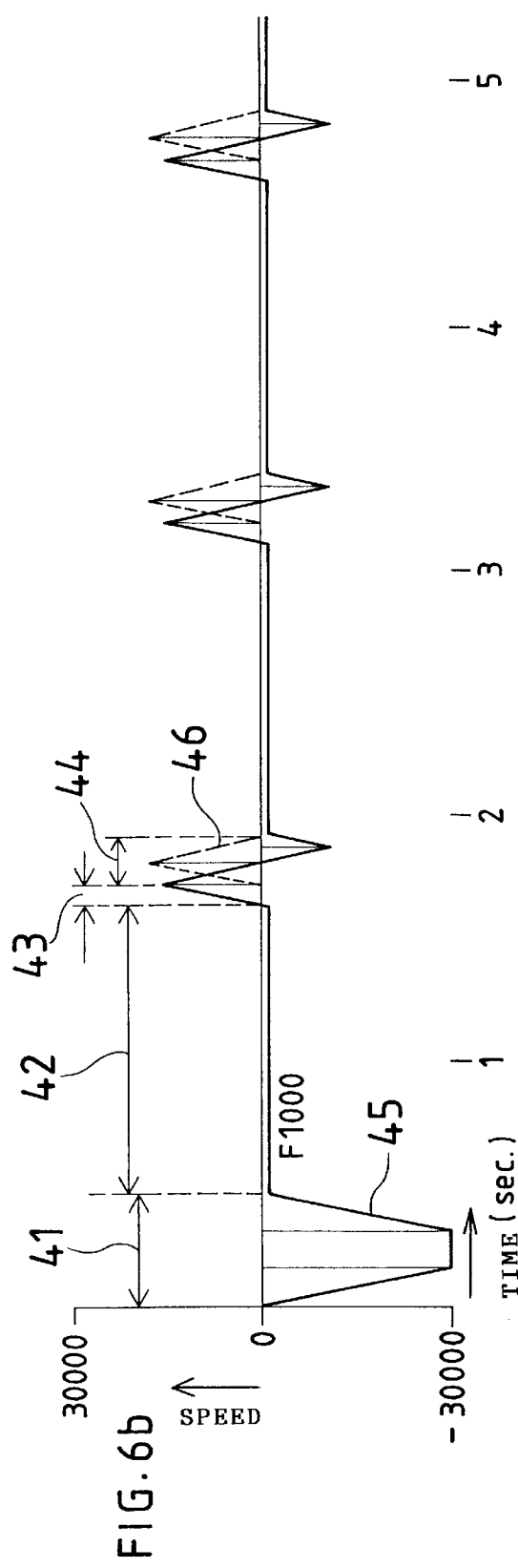

φ6.8 DRILLING AT 15mm PITCH, 14 BORES

| | MACHINING TIME (sec.) | | |
|---|---|---|---|
| | TIME CONSTANT 20msec | TIME CONSTANT 100msec | TIME CONSTANT 150msec |
| CONVENTIONAL DRILLING CYCLE | 21.765 | 22.880 | 23.515 |
| SLOWDOWN DRILLING CYCLE (FIRST EXAMPLE) | 20.576 | 20.645 | 20.699 |
| SLOWDOWN DRILLING CYCLE (SECOND EXAMPLE) | 18.283 | 18.421 | 18.400 |

5,888,037

METHOD OF AND APPARATUS FOR MOVING FEED SHAFTS OF NUMERICAL CONTROLLED MACHINE TOOL

TECHNICAL FIELD

The present invention relates to a method of and an apparatus for moving feed shafts of a numerical controlled machine tool, and more particularly to a feed-shaft moving method and an apparatus therefor in performing a machining operation including a rapid traverse motion.

BACKGROUND ART

In performing various machining operations using a numerical controlled machine tool, the movement of the tool with respect to a workpiece is shifted from a rapid traverse to a machining feed or vice versa by the movement of X, Y and Z axes of the machine. Such machining operation is exemplified by a boring operation by the movement of the Z-axis as a simple example.

FIGS. 15a and 15b illustrate the boring operation performed by the Z-axis motion in a conventional manner. FIG. 15a shows a moving path of a drill 31a. The axial motion by the rapid traverse is indicated by a dotted arrow, and the axial motion by a cutting feed is indicated by a solid arrow. Any motion is caused by the movement of the Z axis. A spindle is rotating at a previously commanded rotational speed.

In a section 81, a tip of the drill 31a moves closer to a surface of the workpiece. In a section 82, the drill tip moves to the machining position of a bottom of the bore by cutting feed at the commanded speed. In a section 83, the drill tip moves to a start point of the movement of the section 82 by the rapid traverse. In a section 84, the drill tip moves to a start point of the movement of the section 81 by the rapid traverse.

FIG. 15b is a diagram showing the movement in the Z-axis direction in the form of a speed wave. The vertical axis represents the speed, and the horizontal axis represents the time; the "+" direction of the vertical axis indicates the direction in which a spindle head is raised.

In the section 81, the spindle head moves downwardly in the Z-axis direction as accelerated up to the rapid traverse speed and then keeps traveling at the rapid traverse speed. Then, the movement of the spindle head is decelerated until the speed becomes "0" again. The accelerating time from "0" to the rapid traverse speed and the decelerating time from the rapid traverse speed to "0" are set by parameters for defining time constants for acceleration/deceleration. The acceleration/deceleration time constant is controlled to an appropriate value so as not to give an impact to the machine. In this example, the maximum moving speed and the acceleration/deceleration time constant are set to such values that can be set for a numerical controlled machine tool capable of a relatively high-speed movement. In the section 82, the spindle head moves downwardly in the Z-axis direction at the commanded feeding speed while executing the cutting operation.

In the section 83, the spindle head moves to the position of the Z coordinate at which the machining has started by the rapid traverse motion. At that time, since the extent of movement is small, the Z-axis moving speed is shifted to deceleration during acceleration without reaching the rapid traverse speed. In the section 84, the spindle head moves to the start point of the section 81 by rapid traverse motion.

Upon termination of deceleration of each movement, it is confirmed that the spindle head has entered the tolerance of the commanded position, and then the spindle head starts the next movement.

A conventional example in which a workpiece is cut into a predetermined profile by moving the workpiece relative to the tool as the X-, Y- and Z-axis motors will be described. FIG. 16 shows a cutting of a workpiece into a predetermined profile according to the conventional axial movement. In this conventional example, the workpiece 21a is cut horizontally by a drill or cutter 31a. During that time, the cutter 31a moves in a first section 1a from a point P11 to a point P12 by a straight rapid traverse; a second section 2a from the point P12 to a point P13 by the straight rapid traverse; in a third section 3a from the point P13 to a point 14 by the straight cutting feed; a fourth section 4a from the point P14 to a point P15 by the straight cutting feed, and then in a fifth section 5a from the point P15 to a point 16 again by the straight rapid traverse. The rapid traverse in this example is carried out by a positioning motion by a straight-line interpolation, that is, the positioning motion with a substantially straight moving path. Accordingly, the successive points are connected by straight lines.

In the conventional axial moving method, the speed always becomes "0" at both of the start and end points of the movement. Accordingly, a wasteful interruption is repeated very frequently in the machining of the workpiece, which would be a cause for extending the machining time, thus lowering the productivity of the machine.

Frequent acceleration/deceleration more than necessary increases the quantity of heat generated by the motor, to cause overheating. If the motor overheats, machining has to be temporarily stopped, which would lower the productivity of the machine. Further, if the acceleration/deceleration is set with an increased tolerance of heat so as to avoid overheating, adequate performance of the motor can not be achieved, thus lowering the rate of production.

SUMMARY OF THE INVENTION

It is an object of the present invention to provide an axial moving method capable of reducing the time necessary for a movement for non-cutting operation of a numerical controlled machine tool.

Another object of the invention is to provide an axial moving apparatus for a numerical controlled machine tool, capable of moving a tool between machining positions in a reduced time.

According to a first aspect of the invention, while a tool is shifted from rapid traverse motion to machining-feed motion, a feed shaft is moved from a start position of rapid traverse motion to a target position continuously via a path blended into an end point of the machining-feed motion. As a result, when shifting from rapid traverse motion to machining-feed motion, it is possible to keep a high speed, with no interruption, so that the tool can travel to the start position of the next machining in a reduced time by the rapid traverse motion.

According to a second aspect of the invention, while the tool is shifted from machining-feed or rapid traverse motion to rapid traverse motion, the feed shaft is moved continuously to a target position at a rapid traverse speed via a path connected to an end point of machining-feed or rapid traverse motion. As a result, when shifting from a machining-feed motion or a rapid traverse motion to a rapid traverse motion, it is possible to keep a high speed, with no interruption, so that the tool can travel between the successive machining positions by rapid traverse motion.

According to a third aspect of the invention, the above-mentioned methods are carried out by an apparatus for moving a tool with respect to a workpiece by driving a feed shaft of each axis of an numerical controlled machine tool, including: pre-processing means for reading and decoding a machining program one block after another to output a motion command for each feed shaft and also outputting a continuous movement signal when a continuous movement command is read from a block designating a rapid traverse motion; path extending means for setting an end-point coordinate for slowdown at a position where a path designated by a preceding block immediately before said one block is extended by a predetermined length towards an end point of the preceding block and also a start-point coordinate for speed up at a position where a path designated by the next block by a predetermined length towards a start point of the next block, when the continuous movement signal is outputted from said pre-processing means; moving-start-timing discriminating means for discriminating whether execution of said movement designated by said one block should wait until each shaft arrives at a target coordinate or said movement designated by said one block should be executed continuously, and judging that the movement designated by said one block should be continuously executed when the continuous moving signal is outputted; interpolation means for outputting a shaft motion command for each feed shaft according to the motion command outputted from the pre-processing means and when the moving-start-timing discriminating means judges that the movement designated by said one block should be continuously executed, executing said movement designated by the preceding block to the end-point coordinate for slowdown, and continuously executing a rapid traverse motion command from the end-point coordinate for slowdown to the start-point coordinate for speed up and also continuously executing the movement designated by the next block from the start-point coordinate for speed up; and acceleration/deceleration control means provided for each feed shaft for controlling the acceleration/deceleration of the shaft motion command according to a preset time constant for the acceleration/deceleration.

As the shaft motion command for the individual axis is processed by an acceleration/deceleration control of the acceleration/deceleration control means, a time lag occurs between an output of the shaft motion command from the interpolation means and the actual movement. When the movement is kept continuously, a moving path is rounded at the corner section where the motion command overlaps. In this round path section, which is regarded as a speed-up section or a slowdown section, the feed shaft can be moved in a reduced time during the rapid traverse motion.

BRIEF DESCRIPTION OF DRAWINGS

FIG. 1 is a diagram showing the principles of a feed-shaft moving method according to the present invention;

FIG. 2a is a diagram showing a speed wave-form of a tool tip cutting according to the method of the invention as shown in FIG. 1;

FIG. 2b is a diagram showing a speed wave-form of a tool tip cutting according to the conventional method of FIG. 16;

FIG. 4 is a perspective view showing a numerical control boring machine for carrying out the method of this invention;

FIG. 6a is a diagram showing a speed wave-form of the cutter during the boring of FIG. 5a;

FIG. 6b is a diagram showing a speed wave-form of the cutter during the boring of FIG. 5b;

FIG. 8a is a diagram showing a speed wave-form of the tool during the tapping of FIG. 7a;

FIG. 9 shows a first example of a machining program using a slowdown drilling cycle;

FIG. 11 shows a second example of a machining program using a slowdown drilling cycle;

FIG. 13 is a table showing the machining time of a drilling cycle according to the first and second examples of the machining programs in comparison with the machining time of a drilling cycle according to the conventional method;

FIG. 15b is a diagram showing a speed wave-form of the Z axis during the conventional boring of FIG. 15a.

DESCRIPTION OF THE PREFERRED EMBODIMENTS

Figure 3:
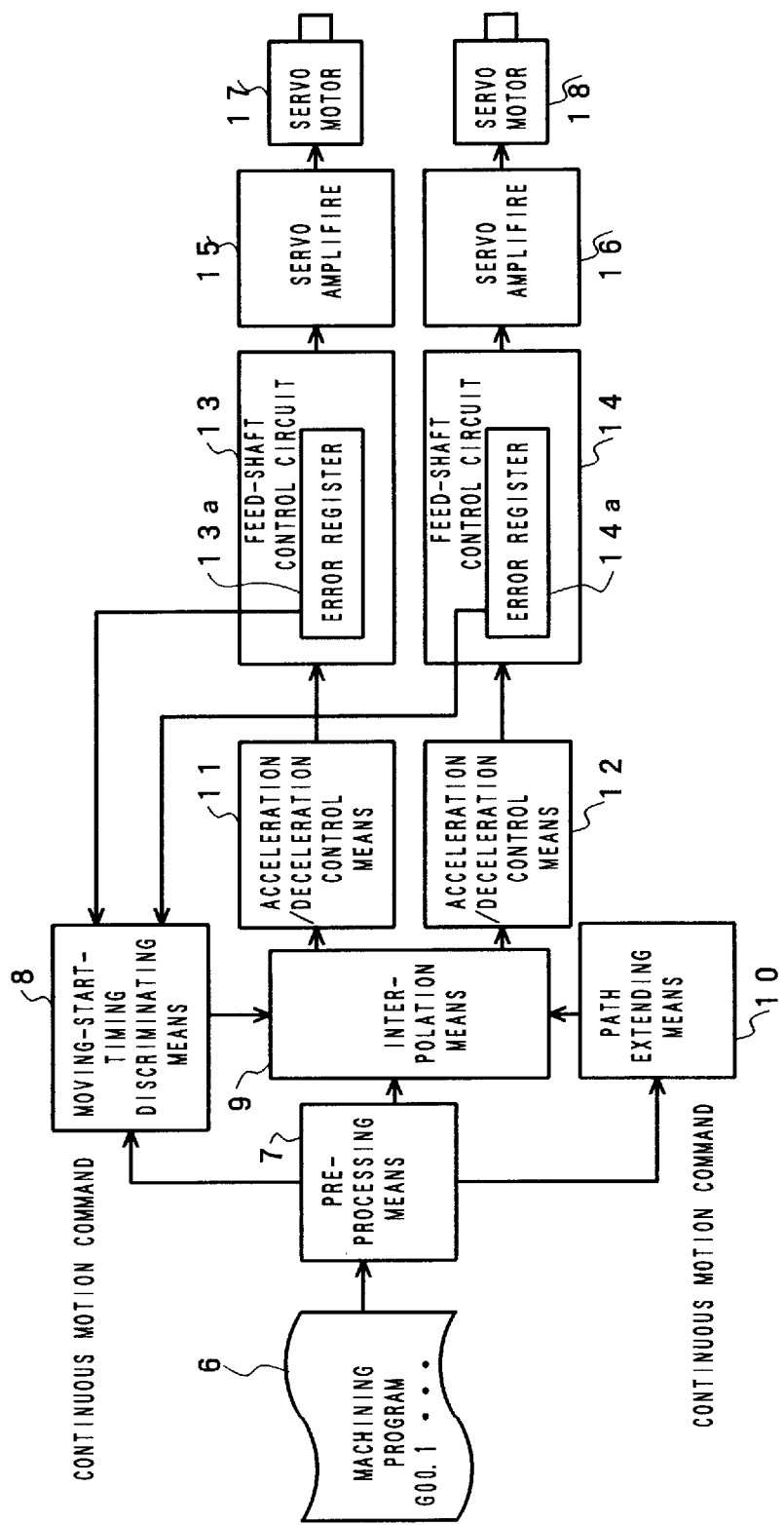
FIG. 3 is a block diagram showing the general construction of a numerical control apparatus according to this invention.

FIG. 1 shows an example in which a workpiece 21 is horizontally cut along its profile by a cutter 31 by driving respective motors for the X, Y and Z axes to move the workpiece 21 with respect to the cutter 31. The cutter 31 is moved in a straight line in a section 1 from a point P1 to a point P2 by a rapid traverse motion. In a section 2 from the point P2 to a point P3, the cutter 31 is moved in a smooth curved line by the rapid traverse motion. In either of a section 3 from the point P3 to a point P4 and a section 4 from the point P4 to a point P5, the cutter 31 is moved in a straight line by a machining-feed motion, while in a section 5 from the point P5 to a point P6, the cutter 31 is moved in a smooth curved line by the rapid traverse motion likewise in the section 2. At all of these points except the point P4, positioning of the cutter 31 does not take place.

In other words, when the motion of the cutter 31 is shifted from the machining-feed to the rapid traverse, a machining-feed path and a rapid traverse path are connected with each other by a rapid traverse path having a curve continuous with the machining-feed path. At that time, the cutter 31 is accelerated from a machining-feed speed to a rapid traverse speed while it passes the curve. Further, when the motion of the cutter 31 is shifted from the rapid traverse to the machining feed, the rapid traverse path is connected with the machining feed path by a path having a curve continuous with the machining feed path in the vicinity of an end point of the rapid traverse motion. At that time, the cutter 31 is decelerated from the rapid traverse speed to the machining-feed speed while it passes the curve. Furthermore, when the motion of the cutter 31 is shifted from the rapid traverse to the rapid traverse, the rapid traverse path is connected with the next rapid traverse path having a curve continuous with the rapid traverse path. As a result, the rapid traverse of the cutter 31 by each axis motion can be completed in a reduced time without an unnecessary interruption and without giving any impact on the numerical controlled machine tool.

Figure 16:
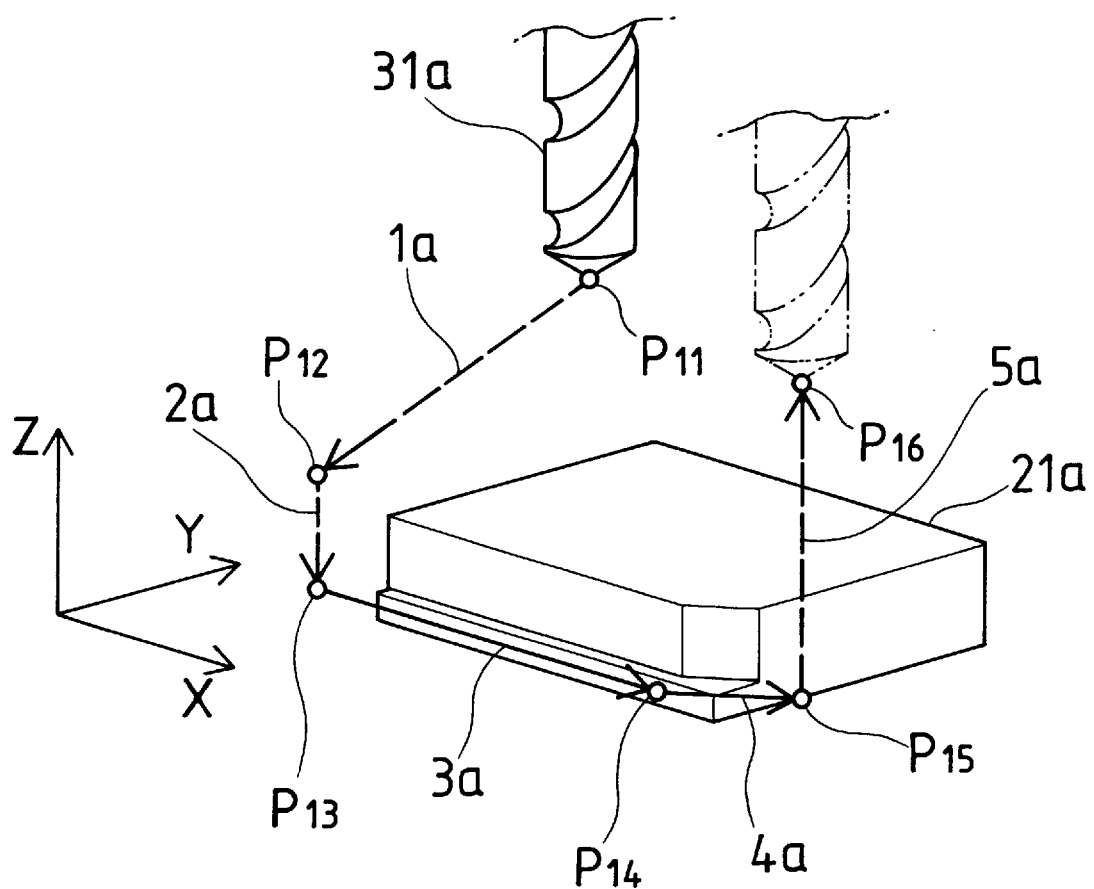
FIG. 16 is a diagram showing the manner in which a workpiece is milled along its profile according to the conventional shaft moving method.

FIGS. 2a and 2b are diagrams for comparison between a speed wave-form during the cutting operation according to the method of the present invention as shown in FIG. 1 and a speed wave-form during the cutting operation according to the conventional method as shown in FIG. 16. FIG. 2a shows the speed wave-form of the tool tip during the cutting operation according to the conventional method of FIG. 16. The vertical coordinate represents the composite speed of the respective speeds of the X, Y and Z axes, while the horizontal coordinate represents the time. In the conventional method, the speed is made "0" in the transition between the successive sections of the movement path. At that time, the non-cutting moving time (total time during which the cutter is moved without cutting) is 415 msec.

FIG. 2b is the speed wave-form of the tool tip during the cutting according to the present method of FIG. 1; the vertical coordinate represents the composite speed of the respective speeds of the X, Y and Z axes, while the horizontal coordinate represents the time. In every transition between the successive sections except the sections 3 and 4, the moving speed of the cutter 13 is not "0"; this is, the cutter 13 is moved continuously with no interruption. At that time the non-cutting moving time is 97 msec, which is approximately 72% of that in the conventional method.

Although it could be suspected that, in the absence of positioning at the start and end positions during movement, a difference might occur in the actual movement path, machining is influenced by displacement of the cutter off the commanded path only while the cutter touches the workpiece, namely, only during the machining-feed section. In the rapid traverse section, even when the cutter is displaced off the movement path in a range where it does not interfere with either the workpiece or the jig, the machining does not receive any influence from such displacement.

The interruption between successive movement paths is called "in-position checking". The term "in-position checking" means controlling such that the next command is not executed until it is detected that the position of each axis has arrived at a predetermined range of the commanded position.

When a command for continuous movement is outputted, the cutter is not always moved along a path having a curve without in-position checking. Discrimination as to whether or not in-position checking should take place is made in the following grouped situations:

The first group of situations is when the tool is shifted from rapid traverse motion to cutting-feed motion: this first group is further divided into two subgroups; in one subgroup the moving direction is reversed, and in the other subgroup the moving direction is not reversed. Reversing the moving direction means moving backward in the movement path; in this situation, likewise the conventional positioning mode, the tool is decelerated near the end point of rapid traverse motion to take in-position checking so as not to cause displacement off the path, and then the next cutting-feed motion is not executed until after the displacement is reduced to an in-position tolerance. If the moving direction is not reversed, the tool is moved by rapid traverse motion in a curved path continuously leading to the start point of the next cutting-feed motion.

The second group of situations is when the tool is shifted from cutting-feed motion to rapid traverse motion: if the moving direction is reversed, the tool is decelerated near the end point of cutting-feed motion to take in-position checking so as not to cause displacement off the movement path, and then the next rapid traverse motion is not executed until after such displacement is reduced to an in-position tolerance. If the moving direction is not reversed, the next rapid traverse motion is executed passing a curved path continuously connecting with the end point of the right preceding cutting-feed motion.

The third group of situations is when the tool is shifted from rapid traverse motion to rapid traverse motion: if the moving direction is reversed, the tool is decelerated near the end point of rapid traverse motion to take in-position checking so as not to cause displacement off the movement path, and then the next rapid traverse motion is executed. If the moving direction is not reversed, the next rapid traverse motion in a curved path connects continuously with the end point of the preceding rapid traverse motion.

A numerical controlled machine tool for carrying out the foregoing method will be described. In the following description, the curved path is divided into two sections, i.e. a speed-up section and a slowdown section. The term "speed-up section" means a curved section continuous with a start point of machining-feed motion, and the term "slowdown section" means a curved section continuous with an end point of machining-feed or rapid traverse motion.

For completing rapid traverse motion in a minimum time, the optimum extent of speed-up movement depends on the speed of the next machining-feed motion and the length of the right preceding rapid traverse motion. Likewise, the optimum extent of slowdown movement depends on the speed of the right preceding machining-feed or rapid traverse motion and the length of the next rapid traverse motion. Various methods may be used for calculating the extent of slowdown movement and the extent of speed-up movement. For example, according to one method, parameters of "the extent of speed-up and slowdown movement with respect to the maximum machining-feed speed" are set, and then the optimum extent of speed-up movement and the optimum extent of slowdown movement are calculated based on the machining-feed speed using the set parameters. Alternatively, parameters may be set as "tolerance of displacement off the path between successive rapid traverse motion blocks, and then the extent of slowdown movement when the movement is shifted from one rapid traverse section to the next rapid traverse section may be controlled so as to decrease the moving speed before reaching the curved section in such a manner that the displacement off the path is less than the tolerance if the set value is small.

The curved section is provided with the speed-up section and the slowdown section by overlapping the respective executions of successive command blocks, when the moving direction is changed, utilizing the delay of acceleration/deceleration. For providing the speed-up section by the delay of acceleration/deceleration, the length of the next movement is extended by a predetermined value on an extension of the start point (namely, the start point is moved off to the upstream side), whereupon the next movement is started without in-position checking. For providing the slowdown section by the delay of acceleration/deceleration, the length of the right preceding movement is extended by a predetermined value on an extension of the end point (namely, the end point is moved off to the downstream side), whereupon the next movement is started without in-position checking.

The interior construction of a numerical control apparatus for creating a speed-up section and a slowdown section by utilizing this overlapping will now be described with reference to FIG. 3.

FIG. 3 is a block diagram showing general construction of the numerical control apparatus of this invention. In FIG. 3, a machining program 6 is a program for instructing a movement path to execute a designated machining operation. In the machining program 6, "G00" is used as an ordinary positioning command, and "G00.1", as a command for rapid traverse motion in a continuous operation. In the example of FIG. 1, "G00.1" is written in the blocks corresponding to the sections 2 and 5.

Pre-processing means 7 reads and decodes the machining program 6 one block at a time and outputs a command for moving the tool; if "G00.1" is read, a continuous movement signal for moving the tool in quick feed continuously is outputted.

When the continuous movement signal is outputted, path extending means 10 sets a slowdown-end-point coordinate at a position such that a path of one block is extended by a predetermined length off to the end point. At the same time, the path extending means 10 sets also a speed-up-start-point coordinate at a position such that a path of the next block is extended by a predetermined length off to the start point.

Moving-start-timing discriminating means 8 discriminates whether execution of the movement designated by one block should be wait until the shaft of each axis arrives at a target position or the movement designated by one block should be executed irrespective of the arrival of the shaft of each axis at the target position (whether or not in-position checking should be executed). If it is discriminated that execution of the movement of one block should be wait until the shaft of each axis arrives at the target position, the moving-start-timing discriminating means 8 outputs to interpolation means 9 a command for permitting execution of the block after having confirmed that the values of error registers 13a, 14a in shaft control circuits 13, 14 enter an in-position tolerance. If it is discriminated that the movement of one block should be executed irrespective of the arrival of the shaft of each axis at the target position, the moving-start-timing discriminating means 8 instructs said interpolation means 9 to execute the movement continuously.

If the continuous movement is commanded by "G00.1", the moving-start-timing discriminating means 8 discriminates that the movement of one block should be executed irrespective of the arrival of the shaft of each axis at the target position.

The interpolation means 9 outputs a shaft motion command for each axis as an interpolation pulse according to the motion command. If it is discriminated that the movement should be executed continuously when the rapid traverse motion is commanded, the interpolation means 9 executes the movement of the right preceding block to the slowdown-end point coordinate, continuously executes the rapid traverse motion command from the slowdown-end-point coordinate to the speed-up-start-point coordinate, and further continuously executes the next movement from the speed-up-start-point coordinate.

According to acceleration/deceleration time constants, acceleration/deceleration control means 11, 12 give acceleration/deceleration to the motion commands by the interpolation pulses outputted to each axis. The shaft control circuits 13, 14 receive the interpolation pulses and output the motion commands of each axis to servo amplifiers 15, 16, respectively. The servo amplifiers 15, 16 activate servo motors 17, 18, respectively, according the motion commands.

The shaft control circuits 13, 14 have error registers 13a, 14a, respectively. Signals are inputted from non-illustrated position detectors to the error registers 13a, 14a, and when the shaft arrives at the commanded position, the values of the error registers 13a, 14a will be "0".

Assuming that the rapid traverse motion in the continuous moving mode (G00.1) is executed by the numerical controlled machine tool, the start point of the rapid traverse motion is replaced by a position such that a slowdown section is disposed. Also the end point of the rapid traverse motion is replaced by a position such that a speed-up section is disposed. At either of its start and end points, the rapid traverse motion is executed continuously. As a result, at either of the start and end points of the rapid traverse motion, the path is rounded resulting from the delay of acceleration/deceleration.

In other words, if there is a delay of acceleration/deceleration, a time difference occurs between when the interpolation means outputs the interpolation pulse and when the shaft arrives at an intended position. Therefore, when the motion command is executed continuously, the next movement is started before the preceding movement is terminated; that is, the successive motion commands overlap each other so that the corner of the movement path is rounded. By positively making the corner of the movement path rounded, a speed-up section and a slowdown section are obtained.

Utilizing this delay of acceleration/deceleration, it is possible to provide the speed-up section and the slowdown section. Accordingly, if the rapid traverse motion of the continuous moving mode (G00.1) is used, the non-cutting moving time is reduced when a machining program which includes shifting from the rapid traverse motion to the cutting-feed motion, and vice versa so that the workpiece can be machined with improved efficiency.

The manner in which boring is performed on a numerical control boring machine using a rapid traverse motion command of the continuous moving mode will now be described in detail.

FIG. 4 is a perspective view showing a numerical control boring machine for carrying out the method of this invention. A workpiece 21 to be machined is placed on a table 22. The table 22 is slidably supported on an X-axis guideway 27a of a saddle 27, being movable in the X-axis direction. To the saddle 27 an X-axis servo motor 23 is fixed. To a rotary shaft of the servo motor 23, a ball screw 25 is attached. The ball screw 25 is fitted in a ball nut (not shown) under the table 22. In response to the rotation of the ball screw 25, the table 22 is moved in the X-axis direction.

The saddle 27 is slidably supported on a Y-axis guideway 28a of a bed 28, being movable in the Y-axis direction. To the bed 28 a Y-axis servo motor 24 is fixed. To the rotary shaft of the servo motor 24, a ball screw 26 is attached. The ball screw 26 is fitted in a ball nut (not shown) under the saddle 27. In response to the rotation of the ball screw 26, the saddle 27 is moved in the Y-axis direction so that the table 22 also is moved.

Above the table 22, a spindle head 30 is disposed. The spindle head 30 is moved in the Z-axis direction by a non-illustrated Z-axis servo motor. To a tip of the spindle head 30, a cutter 31 is attached.

With the foregoing construction, by controlling the X-axis servo motor 23 and the Y-axis servo motor 24, it is possible to move the workpiece 21 to a desired position on the X-Y plane. By controlling the rotation of the Z-axis servo motor to move the spindle head 30 in the Z-axis direction, it is possible to move the position of the cutter 31 to a desired position on the Z-axis. Further, by controlling the relative positions of the workpiece 21 and the cutter 31, it is possible to cope with a wide variety of machining.

The following is an example in which boring is performed by the method of this invention. In this example, the relative movement of the cutter 31 and the workpiece 21 is continuous throughout the entire path as compared to the conventional method in which the movement is interrupted between successive machining positions.

Figure 5A:
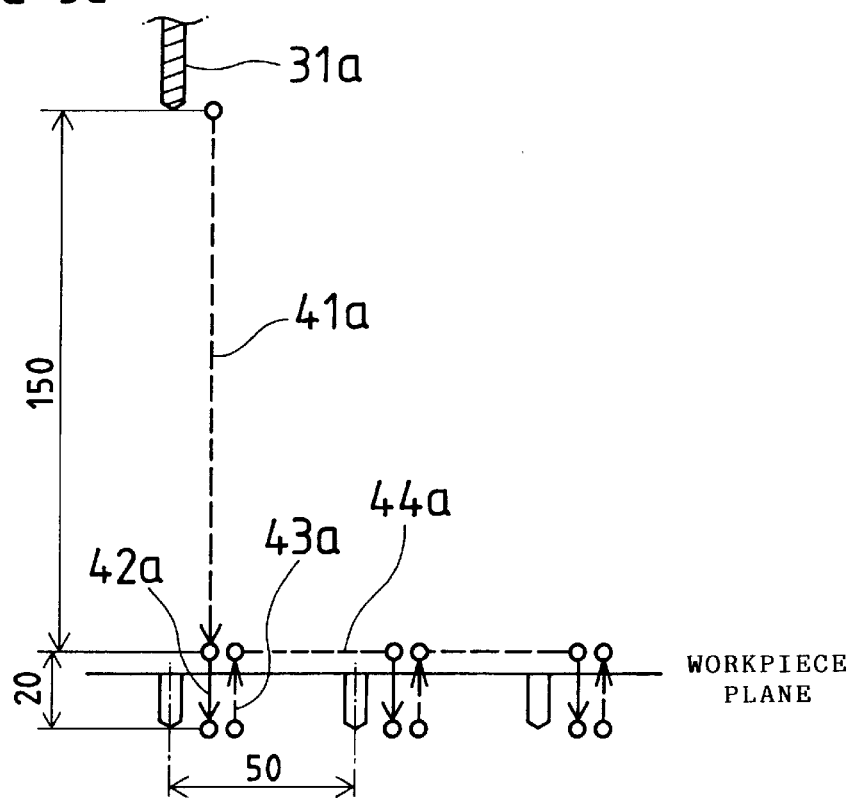
FIG. 5a is a diagram showing a movement path of a cutter when it is moved discontinuously during boring.
Figure 5B:
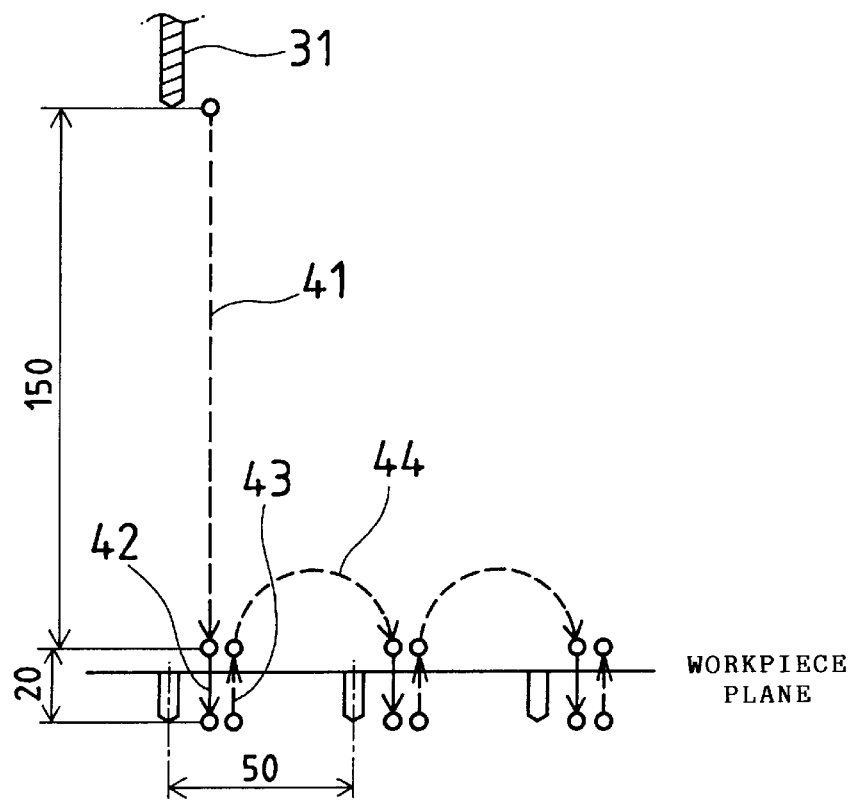
FIG. 5b is a diagram showing a movement path of the cutter when it is moved continuously during boring.

FIG. 5a shows a path in which the movement is discontinuous during boring, and FIG. 5b shows a path in which the movement is continuous during boring. Specifically, FIG. 5a shows the movement of the cutter 31a. In a first section 41a, the cutter 31a travels to a position 20 mm high from the bottom of a possible bore by rapid traverse motion and stops there. In section 42a, the cutter 31a travels to the bore bottom by cutting-feed motion and stops there. In a section 43a, the cutter 31a travels to a position above the next bore by rapid traverse motion and stops there.

FIG. 5b shows the continuous movement of the cutter 31. In a section 41, the cutter 31 travels to a level 20 mm high from the bottom of a possible bore by rapid traverse motion and does not stop there but only slows down to a cutting-feed speed in the next section 42. In the section 42, the cutter 31 travels to the bore bottom by cutting-feed motion and stops there. In a section 43, in order to remove the tool, the cutter 31 travels again to the level 20 mm high from the bore bottom and takes a slowdown from there. In a section 44, the cutter 31 travels in a curved path continuously from the slowdown movement and then takes a speed-up. Because of this speed-up, the moving speed of the cutter 31 becomes the cutting-feed speed in the next section when the cutter 31 arrives at a position above the next bore.

FIG. 6a shows a speed wave-form of the discontinuous movement of the cutter 31 during boring, and FIG. 6b shows a speed wave-form of the continuous movement of the cutter 31 during boring. The speed wave-form of the continuous movement will now be compared with the speed-form of the discontinuous movement. The vertical axis represents the moving speed of movements 45, 45a (indicated by solid lines) of the Z-axis and the moving speed of movements 46, 46a (indicated by dotted lines) of the X-axis, while the horizontal axis represents the time. FIG. 6a shows the case of the discontinuous movement. The moving speed in the Z-axis direction at an end point of the section 41a becomes temporarily "0". After a cutting operation takes place in the section 42a, the speed increases in the section 43a and the speed in the Z-axis becomes "0". At that time, the movement in the direction X-axis direction in the section 44a is started. During that time, the total non-cutting moving time is 1530 msec.

FIG. 6b shows the case of the continuous movement. The cutting-feed motion of the section 42 is started from the end point of the section 41 continuously. The cutter 31 travels continuously from the section 42 to the section 43, increases the moving speed in the Z-axis direction in the section 43 and starts shifting to the slowdown movement at the end point of the section 43. At the end point of the section 43, simultaneously with this, the movement in the X-axis direction also is started. In the front half of the section 43, the speed-up movement is started, and at the end point the moving speed will be the cutting-feed speed for the next bore. During that time, the total non-cutting moving time is 1250 msec, which is approximately 82% of the discontinuous movement.

Thus, in a typical boring operation, it is possible to reduce the total machining time because of the continuous movement.

Also in a tapping cycle in which the rotation of the spindle and the movement of the Z-axis shaft is synchronized, it is basically possible to reduce the total machining time by taking the above-mentioned speed-up and slowdown. However, the tapping cycle is differentiated from other boring cycles in that the rotation of the spindle must be synchronized with the movement of the X-axis shaft.

Figure 7A:
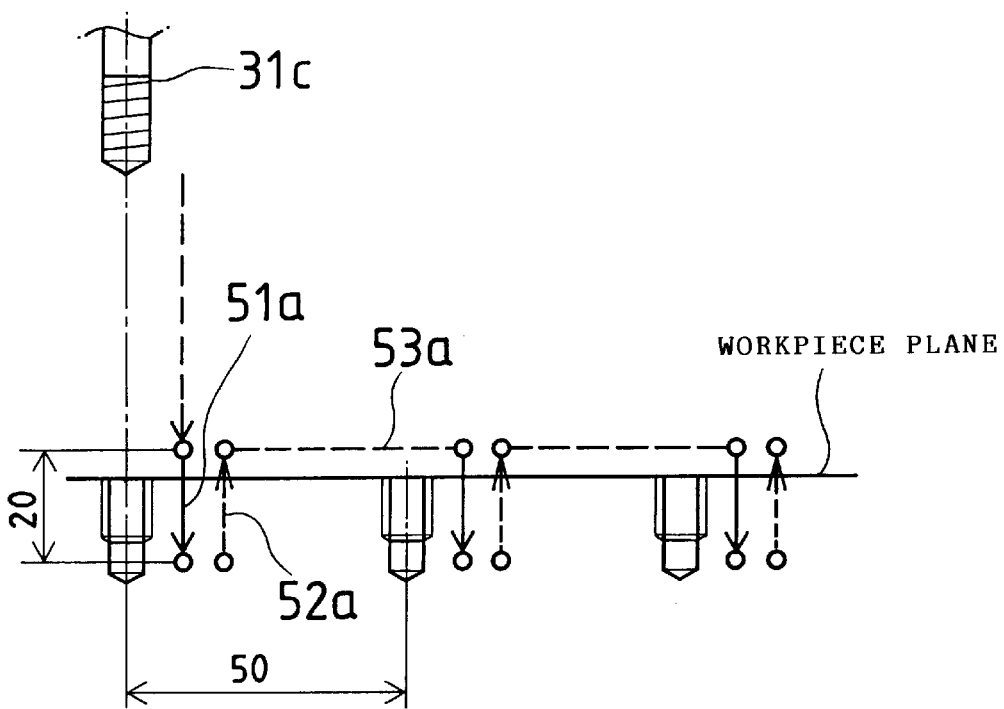
FIG. 7a is a diagram showing a movement path of a tool when it is moved discontinuously during tapping.
Figure 7B:
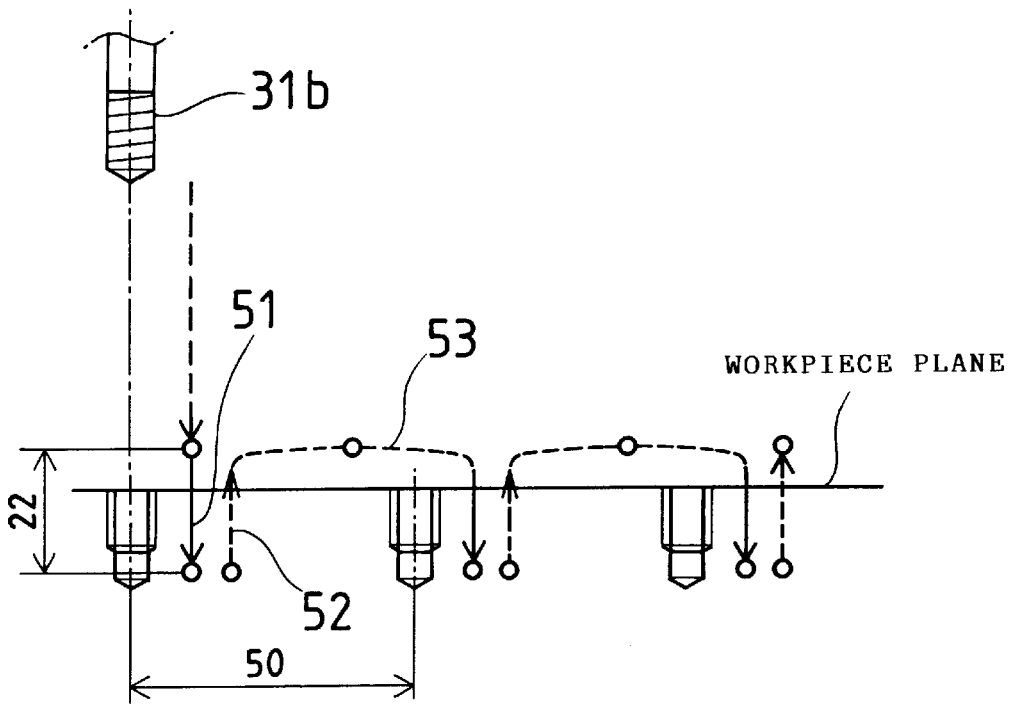
FIG. 7b is a diagram showing a movement path of the tool when it is moved continuously during tapping.

FIG. 7a shows a path of the discontinuous movement during a tapping cycle, and FIG. 7b shows a path of the continuous movement during a tapping cycle. Specifically, FIG. 7a shows the movement of a tool 31c in the case of the discontinuous movement. In a section 51a, the tool 31c travels from a level 20 leads high from the bottom of a possible bore to the bore bottom while synchronizing the rotation of the spindle with the movement of the Z-axis shaft and stops there. In a section 52a, the tool 31c is removed while reversing the rotation of the spindle, and stops there. In a section 53a, the tool 31a travels to a position above the next bore by rapid traverse motion and stops there.

FIG. 7b shows the movement of a tool 31b in the case of the continuous movement. In this example, the extent of speed-up and slowdown is commanded by a program so as to correspond to the two rotations of the spindle. In a section 51, from a level 2 tap leads high above the machining point (22 leads high above the bore bottom), the rotational speed of the spindle and the speed of the Z-axis movement are simultaneously accelerated by a speed ratio corresponding to the tap leads. Then the number of rotations of the spindle is kept, when tapping and, at the same time, the speed of the X-axis movement is kept in such a manner that the speed ratio to the spindle corresponds to the tap lead. Then, the spindle and the Z-axis shaft simultaneously slow down toward the commanded bore bottom. Thus, in the tapping cycle, during a series of acceleration/deceleration, the respective moving extent for the spindle and the Z-axis shaft are commanded in such a manner that the ratio of the rotational speed of the spindle to the moving speed of the Z-axis shaft corresponds to the tap lead.

In a section 52, in order to remove the tool 31b, the spindle with the Z-axis shaft is accelerated again but in a direction opposite to the forward stroke in synchronism with each other. After movement at a predetermined speed, the spindle and the Z-axis shaft are decelerated. The end point of this deceleration is a point 2 tap leads high above the machining point. During this movement, when the tool 31b is moved past the machining start point, the X-axis movement is started in the next section 53 in order to move to the next tapping position.

During movement in the section 53, the tool 31b starts speed-up movement. Upon arrival of the X coordinate at the tapping start position, tapping is executed. Then this procedure is repeated.

Figure 8A:
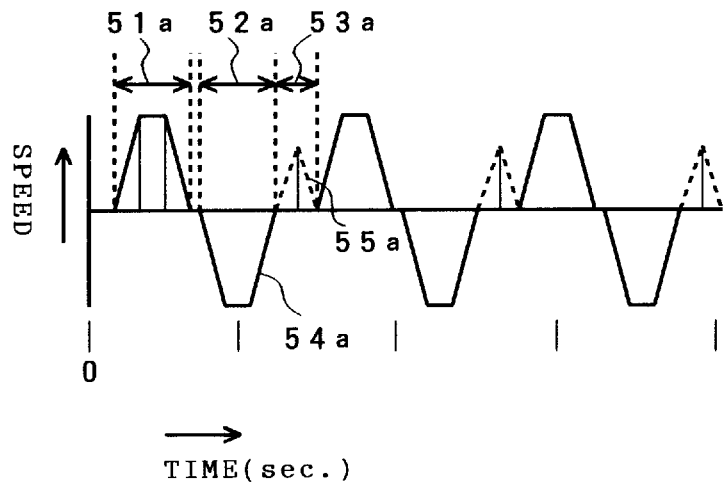
Figure 8B:
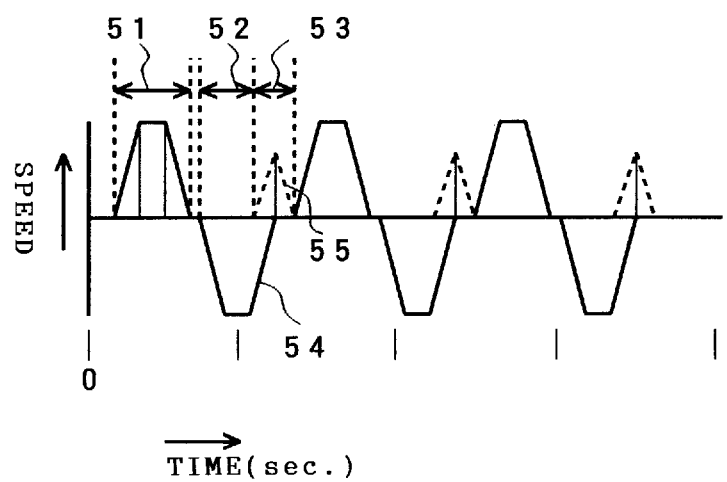
FIG. 8b is a diagram showing a speed wave-form of the tool during the tapping of FIG. 7b.

FIG. 8a shows a speed wave-form of the discontinuous movement during tapping, and FIG. 8b shows a speed wave-form of the continuous movement during tapping. The vertical axis represents the respective moving speeds of the Z-axis movements 54, 54a (indicated in solid lines) and the X-axis movements 55, 55a (indicated in dotted lines), while the horizontal axis represents the time. If the value of the moving speed of the Z-axis shaft is positive, the spindle is rotating in the backward direction (the direction of rotation when removing). If the value of the moving speed of the Z-axis shaft is negative, the spindle is rotating in the forward direction (the direction of rotation when cutting). If the moving speed of the Z-axis shaft is "0", the rotation of the spindle is stopping.

FIG. 8a shows the case of the discontinuous movement. As shown in FIG. 8a, the Z-axis movement and X-axis movement are alternately executed in each section 51a–53a without any overlapping.

FIG. 8b shows the case of the continuous movement. In sections 51, 52, the X-axis movement and the Z-axis movement do not overlap each other. In a section 53, the X-axis movement and the Z-axis movement overlap each other at the majority part. In this case, when removing the tool, a target position is disposed in a level 2 cycle high above the tapping position. And when starting the machining, the tool is accelerated from a position 2 cycle high above the machining position. Therefore, during machining, the time in which the moving speed of the Z-axis shaft must be kept at a maximum speed would be long. As a result, the total non-cutting moving time is reduced, and the total machining time also is reduced. In the tapping cycle, taking a speed-up in moving between successive machining positions is much more effective to reduce the total machining time as compared to minimizing the total non-cutting moving time.

In the foregoing description, a slowdown section and a speed-up section are created in the numerical control apparatus. Alternatively, blocks corresponding to these sections may be previously provided in a machining program so that the continuous movement can be executed. A drilling cycle using a speed-up section and a slowdown section is hereinafter called "the slowdown drilling cycle".

Figure 9:
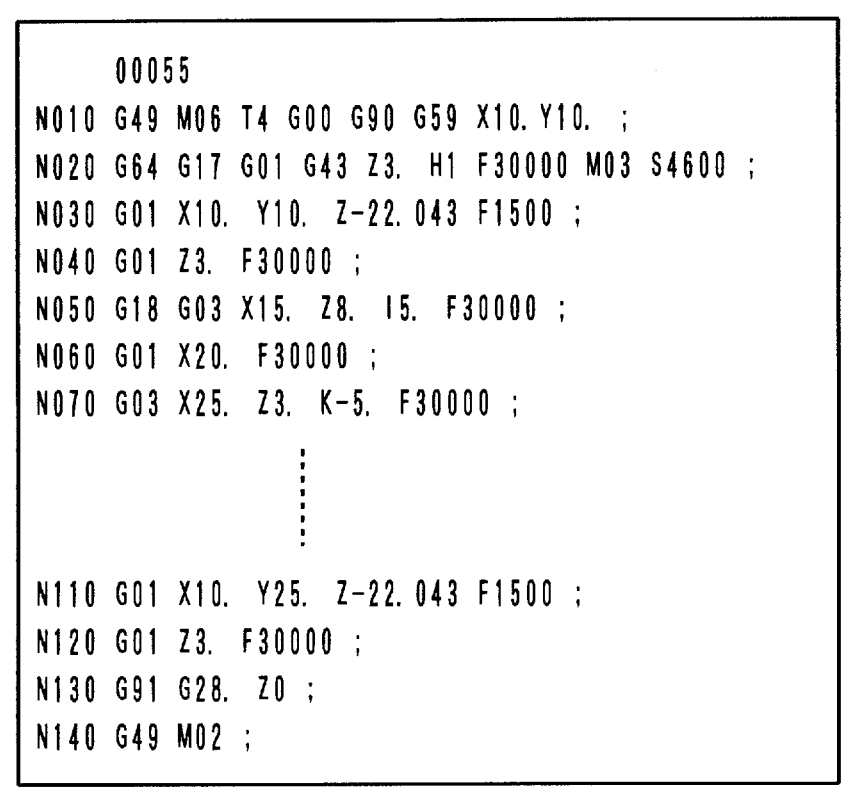

FIG. 9 shows a first example of machining program using the slowdown drilling cycle. In this machining program, blocks of sequence Nos. N040–N070 instruct high-speed cutting-feed motion (G01, G03) as a substitute for the rapid traverse motion. The block of sequence No. N050 is a command in the slowdown section, and the block of sequence No. N070 is a command of the speed-up section.

Figure 10:
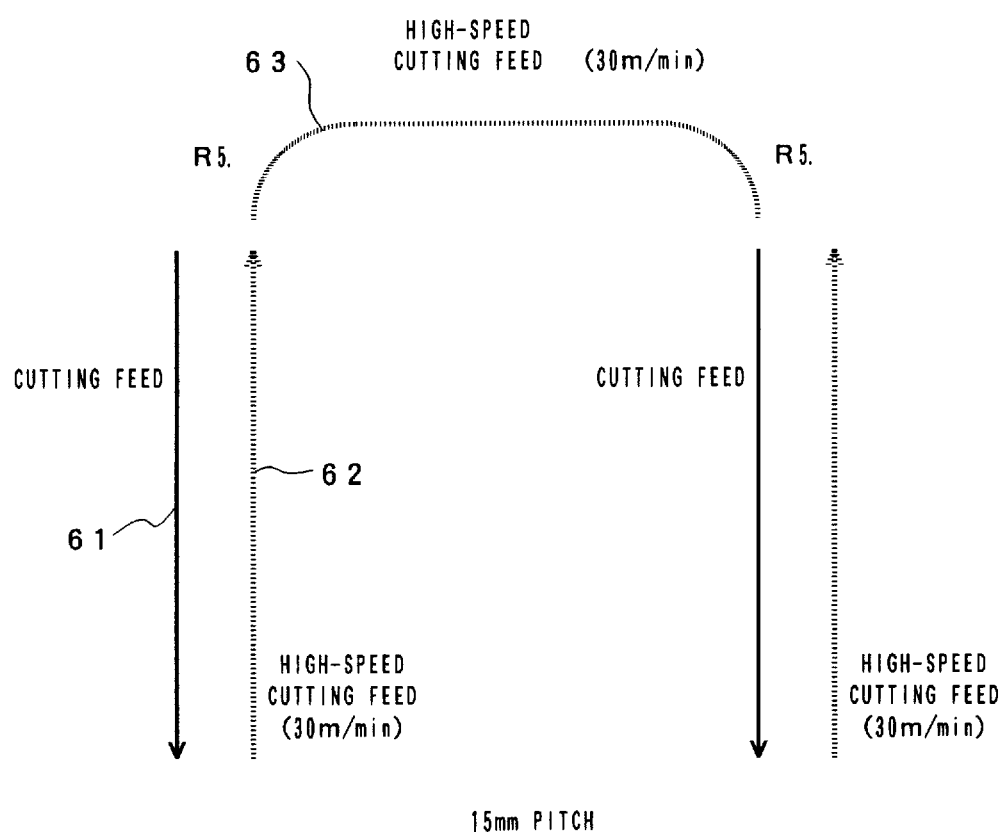
FIG. 10 is a diagram showing a machining path according to the first example of the machining program of FIG. 9.

FIG. 10 shows a machining path according to the first example of machining program. In a section 61, the tool travels to the machining start point by high-speed cutting-feed motion (30 m/min). In a section 63, the tool makes an arcuate movement, a straight movement and an arcuate movement at the same speed as in the section 62. The first arcuate movement is a slowdown section, while the last arcuate movement is a speed-up section.

Figure 11:
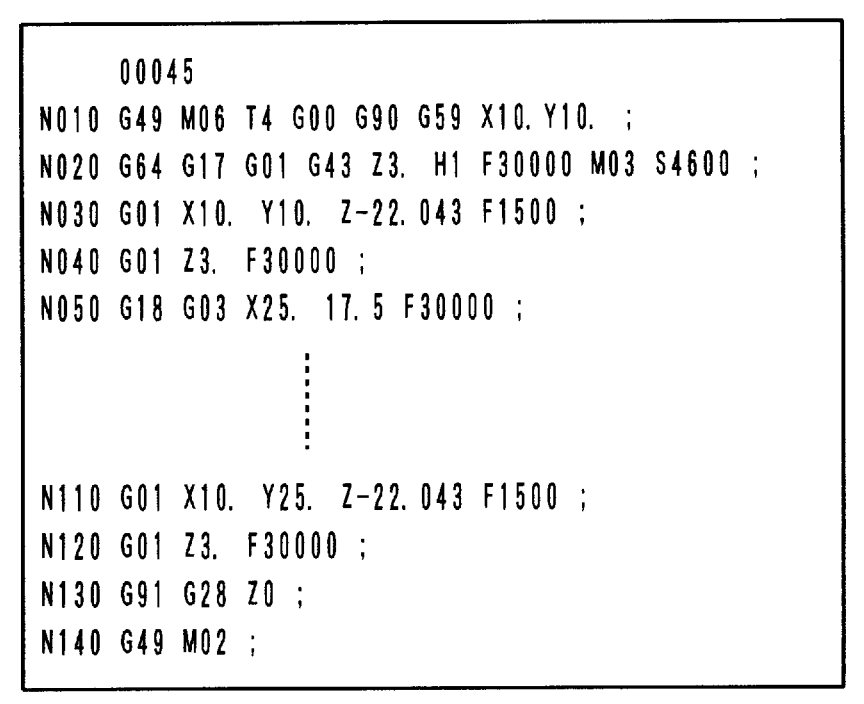

FIG. 11 shows a second example of machining program using a slowdown drilling cycle. In this machining program, blocks of sequence Nos. N040–N050 instruct high-speed cutting-feed motion (G01, G03) as a substitute for the rapid traverse motion command. The block of sequence No. N050 is a common command of both a slowdown section and a speed-up section.

Figure 12:
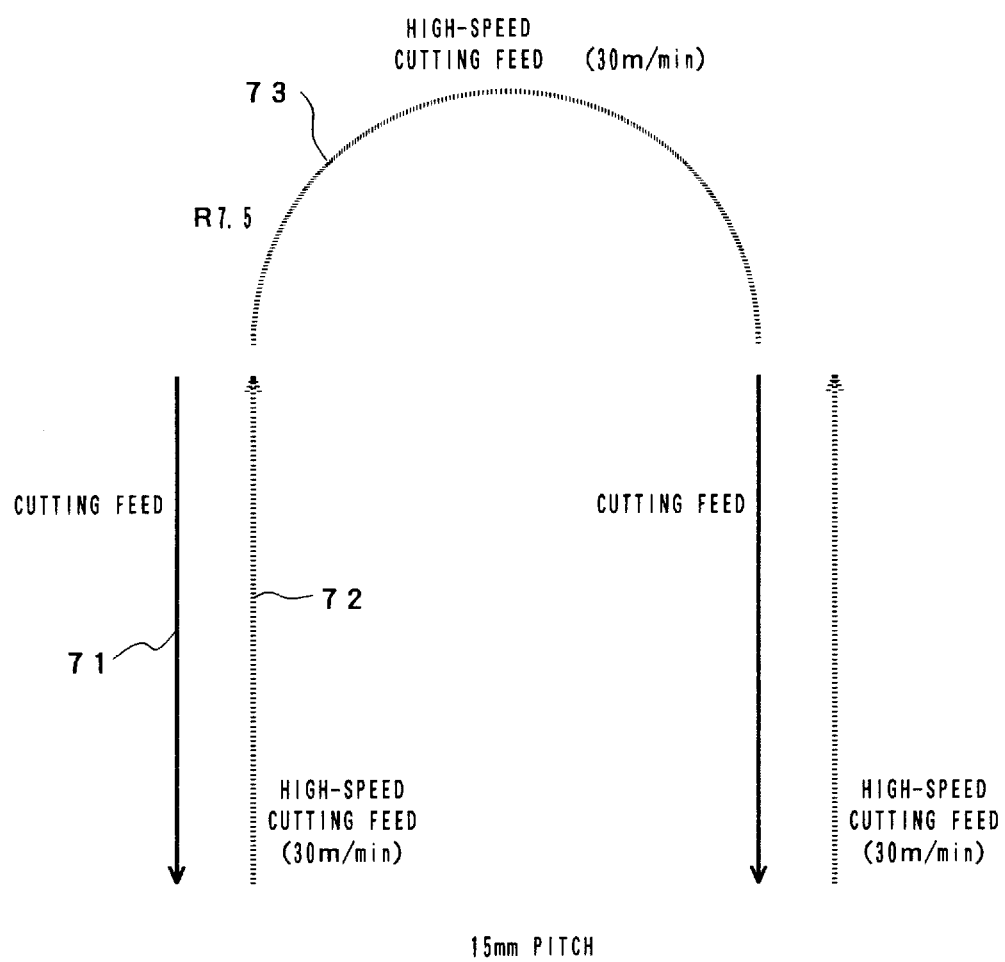
FIG. 12 is a diagram showing a machining path according to the second example of the machining program of FIG. 11.

FIG. 12 is a diagram showing a machining path according to the second example of the machining program. In a section 71, the tool travels from the machining start point to the bore bottom by a cutting-feed motion. In a section 72, the tool travels to the machining start point by high-speed cutting-feed motion (30 m/min). In a section 73, an arcuate movement is made at the same speed as in section 72. The first half of this arcuate movement is a slowdown section, and the second half is a speedup section.

The results of execution of these two examples were compared with the conventional drilling cycle. In the conventional drilling cycle, the tool travels by rapid traverse motion ("30 m/min" when removing the cutter, and "36 m/min when traveling to the next bore to be machined) always except during cutting, and temporarily stops at the start and end points of each movement.

FIG. 13 is a table showing the result of comparison between the result of execution of the two examples according to this invention and the conventional drilling cycle. Using a cutter "f6.8 drill", fourteen bores were continuously machined at a 15 mm pitch. The machining length was "22.043 mm". This machining was performed after interpolation for different acceleration/deceleration time constants.

In the conventional drilling cycle, when the time constant was "20 msec", the machining time was "21.765 sec"; when the time constant was "100 msec", the machining time was "22.880 sec"; when the time constant was "150 sec", the machining time was "23.515 sec".

In the first example (FIG. 10) of slowdown drilling cycle, when the time constant was "20 msec", the machining time was "20.576 sec"; when the time constant was "100 msec", the machining time was "20.645 sec"; when the time constant was "150 msec", the machining time was "20.699".

In the second example (FIG. 12) of slowdown drilling cycle, when the time constant was "20 msec", the machining time was "18.283 sec"; when the time constant was "100 sec", the machining time was "18.421 sec"; and when the time constant was "150 msec", the machining time was "18.400".

This result shows that if the radius of arc for a slowdown section and a speed-up section is increased, the machining time would be reduced. Using a smaller time constant does not always suffice; it has to be an appropriate value according to the curved path. However, the smaller the value of the time constant, the larger impact would occur. Consequently, it is necessary to decide the value of the time constant according to the required machining precision.

Finally, the hardware construction of a numerical control apparatus for carrying out this invention will now be described in brief with reference to FIG. 14.

The numerical control apparatus includes a processor 111 as a pivot part. The processor 111 controls the whole of the apparatus according to a system program stored in ROM 112. For this ROM 112, EPOM or EEPPROM is used.

In RAM 113 in the form of, for example, SRAM, temporary calculation data, display data, input and output signals are stored. In a nonvolatile memory 114, in the form of CMOS backed up by a non-illustrated battery, parameters to be maintained after breaking of power source, a machining program, tool correcting data, pitch-error compensating data, etc. are stored.

A CRT/MDI unit 120 is disposed on the front of the numerical control apparatus or in the same position as a machine operation panel is used for displaying data and graphics, inputting data, and operating the numerical control apparatus. A graphic control circuit 121 converts digital signals such as numerical data and graphic data into luster signals and transmits the luster signals to a display unit 122. The display unit 122 displays these numerical values and graphics. For the display 122, a CRT or a liquid crystal display (LCD) is used.

A keyboard 123 is composed of number keys, symbol keys, character keys as well as function keys and is used for creating and editing a machining program and operating the numerical control apparatus. A software key 124 is disposed under the display unit 122, and its function is displayed on the display unit 122. As the screen of the display unit 122 changes, the movement of the software key 124 also changes according to the displayed function.

A number of shaft control circuits 115 outputs shafts motion commands respectively to a number of servo amplifiers 116 upon receipt of the shaft motion commands from the processor 111. The servo amplifiers 116 amplify the motion commands to drive a number of servo motors connected to a tool machine 130 and control the relative movement of a tool of the tool machine 130 and a workpiece. Either of the number of the shaft control circuits 115 and the number of the servo amplifiers 116 corresponds to the number of the servo motor shafts.

PMC (programmable machine controller) 118 receives an M (auxiliary) function signal, an S (spindle speed control) function signal, a T(tool section) function signal, etc. from the processor 111 via a bus 119. PMC 118 processes these signals by a sequence program and then outputs an output signal to control pneumatic equipment, an electromagnetic actuator, etc. in the tool machine 130. Further, PMC 118 performs a sequence process upon receipt of button signals, switch signals and limit switch signals, etc. of a machine operation panel in the tool machine 130 and transfers necessary input signals to the processor 111 vial the bus 119.

Figure 14:
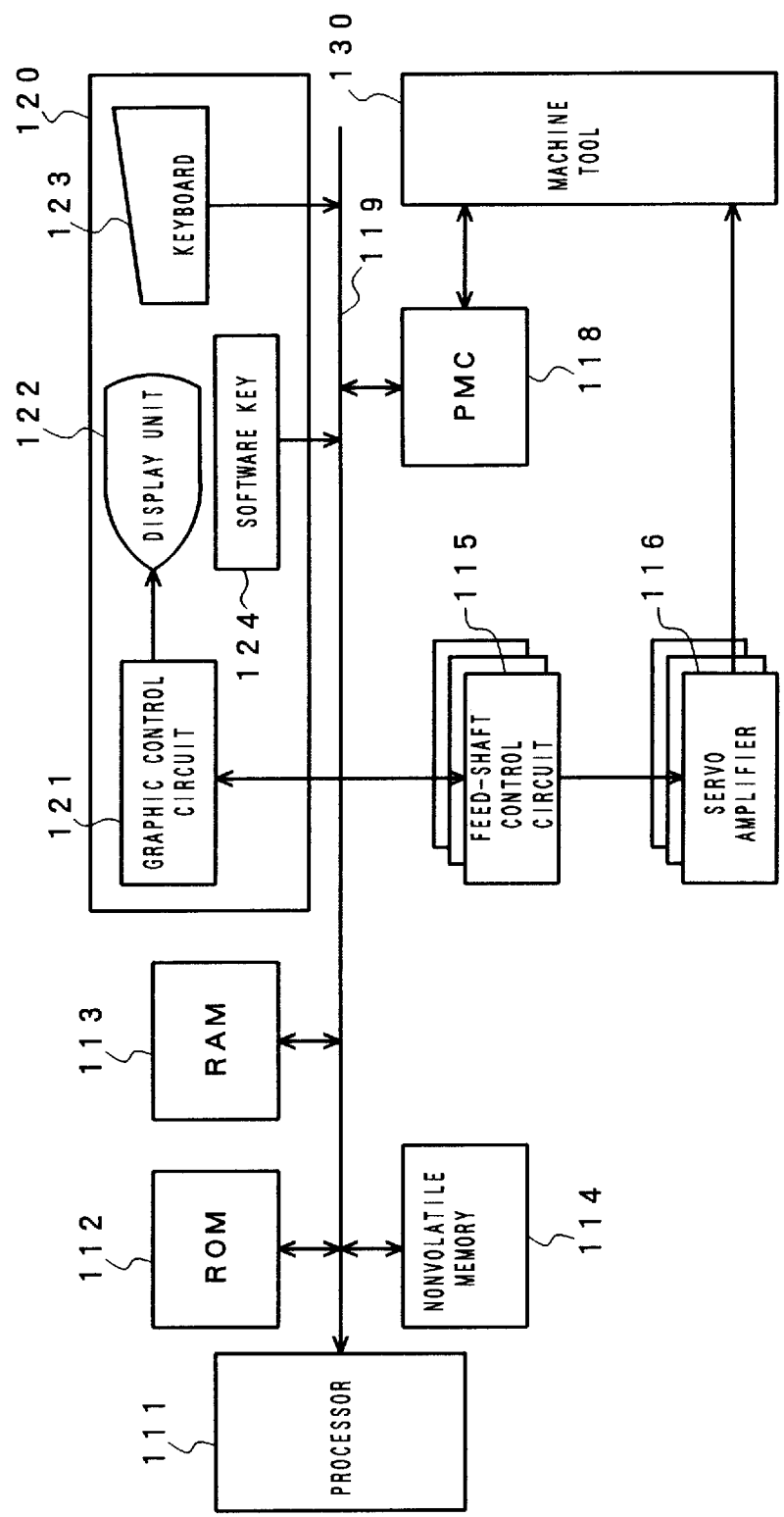
FIG. 14 is a block diagram showing the general construction of hardware of a numerical control apparatus for carrying out the method of this invention.
Figure 15A:
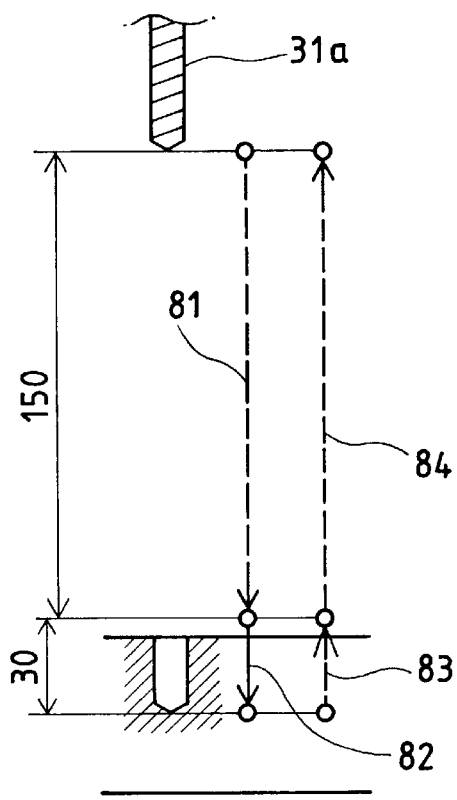
FIG. 15a is a diagram showing the movement of a cutter during the conventional boring.
Figure 15B:
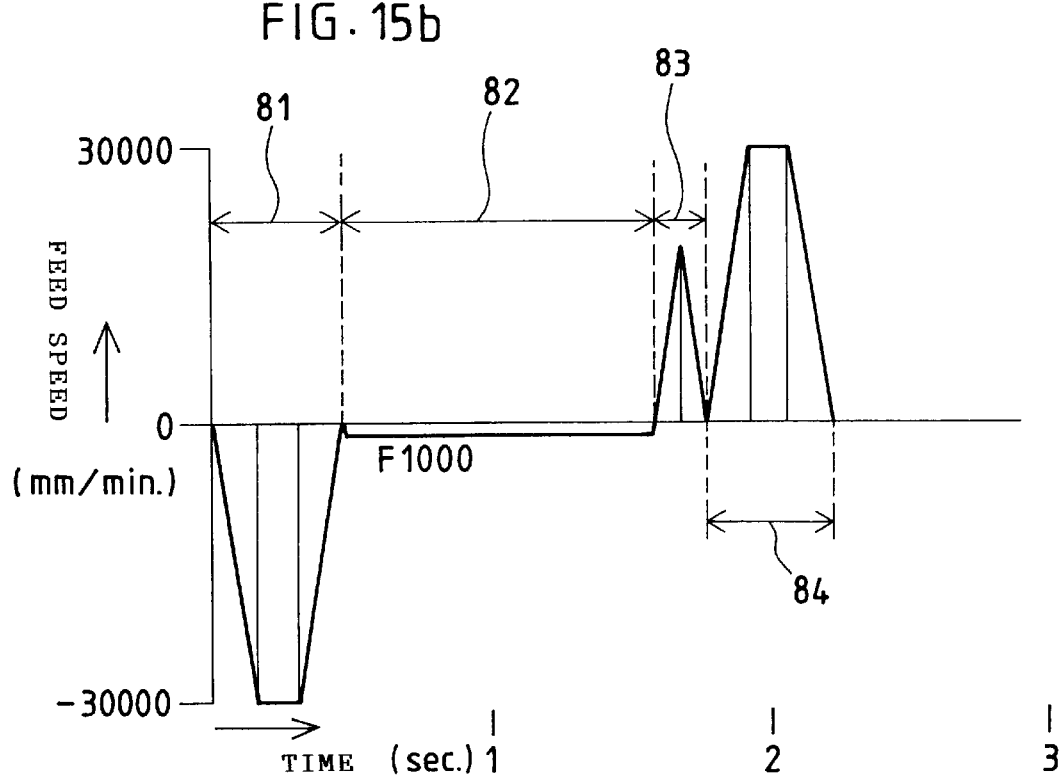

In FIG. 14, a spindle motor control circuit and a spindle motor amplifier are omitted.

In the foregoing example, only one processor 11 is used. Alternatively, two or more processors may be used to construct a multiprocessor.

As is described above, in this invention, since a rapid traverse motion path is changed into a curved path blended into the preceding and succeeding movements without changing the cutting-feed motion path, it is possible to reduce the total non-cutting moving time with unnecessary interruption. As a result, the total machining time is reduced to improve the productivity.

What is claimed is:

1. A method of moving a tool with respect to a workpiece by driving a feed shaft for each axis of a numerical controlled machine tool, comprising the steps of:
   (a) writing a continuous movement command for commanding a continuous movement at a block for designating a rapid traverse motion in a machining program;
   (b) reading said machining program one block after another; and
   (c) moving a tip of the tool in a curved path connecting a start point of the rapid traverse motion of said one block with a start point of a motion of a next block for continuously proceeding said tip of the tool from said rapid traverse motion to said motion designated by the next block, when said continuous movement command is read from said block designating the rapid traverse motion.

2. A method according to claim 1, wherein said motion designated by said next block is a machining feed for a cutting operation.

3. A method according to claim 1, wherein said step (c) includes a step of moving the tool in a curved path connecting the start point of the rapid traverse motion of said one block with a start point of a boring operation at a rapid traverse speed for continuously proceeding to a machining feed speed for the boring operation.

4. A method according to claim 1, wherein said step (c) includes a step of starting a cutting feed motion after synchronizing a rotational speed of a spindle with a cutting feed speed at a point upstream of said start point of a tapping operation in a curved path connecting the start point of the rapid traverse motion of said one block with a start point of the tapping operation.

5. A method of moving a tool with respect to a workpiece by driving a feed shaft for each axis of a numerical controlled machine tool, comprising the steps of:
   (a) writing a continuous movement command for commanding a continuous movement at a block for designating a rapid traverse motion in a machining program;
   (b) reading said machining program one block after another; and
   (c) moving the tool with respect to a workpiece in a curved path connecting an end point of a motion designated by a block immediately preceding said one block with a start point of the rapid traverse motion designated by said one block for continuously proceeding from the motion designated by said immediately preceding block to said rapid traverse motion, when said continuous movement command is read from said block designating the rapid traverse motion in said step (b).

6. A method according to claim 5, wherein said motion designated by said immediately preceding block is a machining feed for a cutting operation.

7. A method according to claim 5, wherein said motion designated by said immediately preceding block is a rapid traverse.

8. A method according to claim 5, wherein said step (c) includes steps of moving the tool in a curved path connecting a start point of one boring operation with a start point of a next boring operation, and starting the rapid traverse motion upon arrival of the tool at the start point of said one boring operation when said one boring operation is terminated.

9. A method according to claim 5, wherein said step (c) includes steps of moving the tool in a curved path connecting a start point of one tapping operation with a start point of the next tapping operation, and terminating acceleration in a cutting-feed direction at a position upstream of said start point of said one tapping operation while synchronizing a rotational speed of a spindle with a cutting-feed speed, and starting the rapid traverse motion upon arrival of the tool at the position upstream of said start point of said one boring operation after said one boring operation is terminated.

10. A method of moving a tool with respect to a workpiece by driving a feed shaft for each axis of a numerical controlled machine tool, comprising the steps of:
   (a) creating a machining program including a block for making the tool perform a rapid traverse motion in a curved path connecting a start point of the motion of said block with a start point of a motion of a next block for continuously proceeding from said motion designated by said block to said motion designated by the next block; and
   (b) reading said machining program one block after another to execute said one block.

11. A method of moving a tool with respect to a workpiece by driving a feed shaft for each axis of a numerical controlled machine tool, comprising the steps of:
   (a) creating a machining program including a rapid traverse block for making the tool perform a rapid traverse motion in a curved path connecting an end point of the motion of a preceding block immediately before said rapid traverse block with a target point of a motion of said rapid traverse block for continuously proceeding from said motion designated by said preceding block to said motion designated by said rapid traverse block; and (b) reading said machining program one block after another to executed said one block.

12. An apparatus for moving a tool with respect to a workpiece by driving a feed shaft for each axis of a numerical controlled machine tool, comprising:

pre-processing means for reading and decoding a machining program one block after another to output a motion command for each feed shaft and also outputting a continuous curved movement signal when a continuous movement command is read from a block designating a rapid traverse motion;

path extending means for setting an end-point coordinate for slowdown at a position where a path designated by a preceding block immediately before said one block is extended by a predetermined length towards an end point of said preceding block and also a start-point coordinate for speed up to a position where a path designated by the next block by a predetermined length towards a start point of the next block, when said continuous movement signal is outputted from said pre-processing means;

moving-start-timing discriminating means for discriminating whether execution of said movement designated by said one block should wait until each shaft arrives at a target coordinate or said movement designated by said one block should be executed continuously, and for judging that said movement designated by said one block should be continuously executed when said continuous moving signal is outputted;

interpolation means for outputting a shaft motion command for each feed shaft according to said motion command outputted from said pre-processing means and, when said moving-start-timing discriminating means judges that said moving designated by said one block should be continuously executed, executing said movement designated by said preceding block to said end-point coordinate for slowdown, and continuously executing a rapid traverse motion command from said end-point coordinate for slowdown to said start-point coordinate for speed up and also continuously executing said movement designated by the next block from said start-point coordinate for speed up; and acceleration/deceleration control means provided for each feed shaft for controlling the acceleration/deceleration of said shaft motion command according to a preset time constant for the acceleration/deceleration.

13. An apparatus according to claim 12, wherein said path extending means sets said end-point coordinate for slowdown at a position such that the rapid traverse motion is started simultaneously with passing of said end point of said movement designated by said preceding block.

14. An apparatus according to claim 12, wherein said path extending means sets said start-point coordinate for speed up at a position such that the rapid traverse motion is terminated simultaneously with passing said start point of said movement designated by said next block.

15. An apparatus for moving a tool with respect to a workpiece by driving a feed shaft for each axis of a numerical controlled machine tool, comprising:

a pre-processor which reads and decodes a machining program one block after another to output a motion command for each feed shaft and also to output a continuous, non-stop, curved movement signal when a continuous movement command is read from a block designating a rapid traverse motion;

a path extender which sets an end-point coordinate for slowdown at a position where a path designated by a preceding block immediately before said one block is extended by a predetermined length towards an end point of said preceding block and also a start-point coordinate for speed up at a position where a path designated by the next block by a predetermined length towards a start point of the next block, when said continuous movement signal is outputted from the pre-processor;

a discriminator which determines whether execution of said movement designated by said one block should wait until each shaft arrives at a target coordinate or said movement designated by said one block should be executed continuously and which judges that said movement designated by said one block should be executed continuously, when said continuous moving signal is outputted;

an interpolator which outputs a shaft motion command for each feed shaft according to said motion command outputted from said pre-processor and, when said moving-start-timing discriminator judges that said moving designated by said one block should be continuously executed, executes said movement designated by said preceding block to said end-point coordinate for slowdown, and continuously executes a rapid traverse motion command from said end-point coordinate for slowdown to said start-point coordinate for speed up and also continuously executes said movement designated by the next block from said start-point coordinate for speed up; and a controller provided for each feed shaft which controls the acceleration/deceleration of said shaft motion command according to a present time constant for the acceleration/deceleration.

16. An apparatus according to claim 15, wherein said path extender sets said end-point coordinate for slowdown at a position such that the rapid traverse motion is started simultaneously with passing of said end point of said movement designated by said preceding block.

17. An apparatus according to claim 15, wherein said path extender sets said start-point coordinate for speed up at a position such that the rapid traverse motion is terminated simultaneously with passing said start point of said movement designated by said next block.

18. A method of moving a tool with respect to a workpiece by driving a feed shaft for each axis of a numerical controlled machine tool, comprising the steps of:

(a) writing a continuous movement command for commanding a continuous non-stop movement at a block for designating a rapid traverse motion in a machining program;

(b) reading said machining program one block after another; and (c) moving a tip of the tool in a curved path connecting a start point of the rapid traverse motion of said one block with a start point of a motion of a next block for continuously proceeding said tip of the tool from said rapid traverse motion to said motion designated by the next block, when said continuous movement command is read from said block designating the rapid traverse motion.

19. A method according to claim 18, wherein said motion designated by said next block is a machining feed for a cutting operation.

20. A method according to claim 18, wherein said step (c) includes a step of moving the tool in a curved path connecting the start point of the rapid traverse motion of said one block with a start point of a boring operation at a rapid traverse speed for continuously proceeding to a machining feed speed for the boring operation.

21. A method according to claim 18, wherein said step (c) includes a step of starting a cutting feed motion after synchronizing a rotational speed of a spindle with a cutting feed speed at a point upstream of said start point of a tapping operation in a curved path connecting the start point of the rapid traverse motion of said one block with a start point of the tapping operation.

22. A method of moving a tool with respect to a workpiece by driving a feed shaft for each axis of a numerical controlled machine tool, comprising the steps of:
   (a) writing a continuous movement command for commanding a continuous non-stop movement at a block for designating a rapid traverse motion in a machining program;
   (b) reading said machining program one block after another; and
   (c) moving the tool with respect to a workpiece in a curved path connecting an end point of a motion designated by a block immediately preceding said one block with a start point of the rapid traverse motion designated by said one block for continuously proceeding from the motion designated by said immediately preceding block to said rapid traverse motion, when said continuous movement command is read from said block designating the rapid traverse motion in said step (b).

23. A method according to claim 22, wherein said motion designated by said immediately preceding block is a machining feed for a cutting operation.

24. A method according to claim 22, wherein said motion designated by said immediately preceding block is a rapid traverse.

25. A method according to claim 22, wherein said step (c) includes steps of moving the tool in a curved path connecting a start point of one boring operation with a start point of a next boring operation, and starting the rapid traverse motion upon arrival of the tool at the start point of said one boring operation when said one boring operation is terminated.

26. A method according to claim 22, wherein said step (c) includes steps of moving the tool in a curved path connecting a start point of one tapping operation with a start point of the next tapping operation, and terminating acceleration in a cutting-feed direction at a position upstream of said start point of said one tapping operation while synchronizing a rotational speed of a spindle with a cutting-feed speed, and starting the rapid traverse motion upon arrival of the tool at the position upstream of said start point of said one boring operation after said one boring operation is terminated.

27. A method of moving a tool with respect to a workpiece by driving a feed shaft for each axis of a numerical controlled machine tool, comprising the steps of:
   (a) creating a machining program including a block for making the tool perform a rapid traverse motion in a curved path connecting a start point of the motion of said block with a start point of a motion of a next block for continuously proceeding non-stop from said motion designated by said block to said motion designated by the next block; and
   (b) reading said machining program one block after another to execute said one block.

28. A method of moving a tool with respect to a workpiece by driving a feed shaft for each axis of a numerical controlled machine tool, comprising the steps of:
   (a) creating a machining program including a rapid traverse block for making the tool perform a rapid traverse motion in a curved path connecting an end point of the motion of a preceding block immediately before said rapid traverse block with a target point of a motion of said rapid traverse block for continuously proceeding non-stop from said motion designated by said preceding block to said motion designated by said rapid traverse block; and
   (b) reading said machining program one block after another to executed said one block.

29. An apparatus for moving a tool with respect to a workpiece by driving a feed shaft for each axis of a numerical controlled machine tool, comprising:
   pre-processing means for reading and decoding a machining program one block after another to output a motion command for each feed shaft and also outputting a continuous, non-stop curved movement signal when a continuous movement command is read from a block designating a rapid traverse motion;
   path extending means for setting an end-point coordinate for slowdown at a position where a path designated by a preceding block immediately before said one block is extended by a predetermined length towards an end point of said preceding block and also a start-point coordinate for speed up to a position where a path designated by the next block by a predetermined length towards a start point of the next block, when said continuous movement signal is outputted from said pre-processing means;
   moving-start-timing discriminating means for discriminating whether execution of said movement designated by said one block should wait until each shaft arrives at a target coordinate or said movement designated by said one block should be executed continuously non-stop, and for judging that said movement designated by said one block should be executed continuously non-stop, when said continuous moving signal is outputted;
   interpolation means for outputting a shaft motion command for each feed shaft according to said motion command outputted from said pre-processing means and, when said moving-start-timing discriminating means judges that said moving designated by said one block should be continuously non-stop executed, executing said movement designated by said preceding block to said end-point coordinate for slowdown, and continuously non-stop executing a rapid traverse motion command from said end-point coordinate for slowdown to said start-point coordinate for speed up and also continuously non-stop executing said movement designated by the next block from said start-point coordinate for speed up; and
   acceleration/deceleration control means provided for each feed shaft for controlling the acceleration/deceleration of said shaft motion command according to a preset time constant for the acceleration/deceleration.

30. An apparatus according to claim 29, wherein said path extending means sets said end-point coordinate for slowdown at a position such that the rapid traverse motion is started simultaneously with passing of said end point of said movement designated by said preceding block.

31. An apparatus according to claim 29, wherein said path extending means sets said start-point coordinate for speed up at a position such that the rapid traverse motion is terminated simultaneously with passing said start point of said movement designated by said next block.

32. An apparatus for moving a tool with respect to a workpiece by driving a feed shaft for each axis of a numerical controlled machine tool, comprising:

a pre-processor which reads and decodes a machining program one block after another to output a motion command for each feed shaft, and also to output a continuous, non-stop, curved movement signal when a continuous movement command is read from a block designating a rapid traverse motion;

a path extender which sets an end-point coordinate for slowdown at a position where a path designated by a preceding block immediately before said one block is extended by a predetermined length towards an end point of said preceding block, and also a start-point coordinate for speed up at a position where a path designated by the next block by a predetermined length towards a start point of the next block, when said continuous movement signal is outputted from the pre-processor;

a discriminator which determines whether execution of said movement designated by said one block should wait until each shaft arrives at a target coordinate or said movement designated by said one block should be executed continuously non-stop, and which judges that said movement designated by said one block should be executed continuously non-stop, when said continuous moving signal is outputted;

an interpolator which outputs a shaft motion command for each feed shaft according to said motion command outputted from said pre-processor and, when said moving-start-timing discriminator judges that said moving designated by said one block should be continuously non-stop executed, executes said movement designated by said preceding block to said end-point coordinate for slowdown, and continuously non-stop executes a rapid traverse motion command from said end-point coordinate for slowdown to said start-point coordinate for speed up, and also continuously non-stop executes said movement designated by the next block from said start-point coordinate for speed up; and a controller provided for each feed shaft which controls the acceleration/deceleration of said shaft motion command according to a present time constant for the acceleration/deceleration.

33. An apparatus according to claim 32, wherein said path extender sets said end-point coordinate for slowdown at a position such that the rapid traverse motion is started simultaneously with passing of said end point of said movement designated by said preceding block.

34. An apparatus according to claim 32, wherein said path extender sets said start-point coordinate for speed up at a position such that the rapid traverse motion is terminated simultaneously with passing said start point of said movement designated by said next block.

* * * * *

UNITED STATES PATENT AND TRADEMARK OFFICE
CERTIFICATE OF CORRECTION

PATENT NO.:     5,888,037                    PAGE 1 of 2
DATED     :     March 30, 1999
INVENTOR(S):    Fujimoto et al.

It is certified that error appears in the above-identified patent and that said Letters Patent is hereby corrected as shown below:

Title Page [75], "Oshino-mura" should be --Minamitsuru--.

[56], "References Cited", U.S. Patent Documents as cited on PTO-892 have been omitted and should be indicated as follows:

| | | |
|---|---|---|
| --5,564,869 | 10/1996 | Furness et al. |
| 3,752,036 | 8/1973 | Hicks et al. |
| 3,854,837 | 12/1974 | Kreithen et al. |
| 4,535,408 | 8/1985 | Kishi et al. |
| 3,636,814 | 1/1972 | Esch |
| 4,778,313 | 10/1988 | Lehmkuhl |
| 5,332,340 | 7/1994 | Pumphrey -- |
| 3,676,651 | 7/1972 | McDaniel |

In the drawings, drawing corrections to Fig. 3 have been omitted as follows:

"AMPLIFIRE" (two occurrences) should be --AMPLIFIER--.

UNITED STATES PATENT AND TRADEMARK OFFICE
CERTIFICATE OF CORRECTION

PATENT NO.   : 5,888,037         PAGE 2 of 2
DATED        : March 30, 1999
INVENTOR(S)  : Fujimoto et al.

It is certified that error appears in the above-identified patent and that said Letters Patent is hereby corrected as shown below:

Col. 3,   line 2, "an" should be --a--.

Col. 5,   line 8, delete "giving".

Col. 9,   line 55, after " -axis" insert --direction--;
          line 56, delete "direction" (first occurrence).

Col. 13,  line 6, "shafts" should be --shaft--.

Signed and Sealed this

Twenty-fourth Day of August, 1999

Attest:

Q. TODD DICKINSON

Attesting Officer        Acting Commissioner of Patents and Trademarks